United States Patent [19]

Nobue et al.

[11] Patent Number: 5,195,317

[45] Date of Patent: Mar. 23, 1993

[54] FILTER REGENERATING APPARATUS FOR AN INTERNAL COMBUSTION ENGINE

[75] Inventors: Tomotaka Nobue; Shigeru Kusunoki; Koji Yoshino, all of Yamatokoriyama; Takashi Kashimoto, Nara, all of Japan

[73] Assignee: Matsushita Electric Industrial Co., Ltd., Osaka, Japan

[21] Appl. No.: 858,242

[22] Filed: Mar. 26, 1992

[30] Foreign Application Priority Data

Mar. 29, 1991 [JP] Japan ..................... 3-66322

[51] Int. Cl.⁵ .............................. F01N 3/02
[52] U.S. Cl. ........................ 60/275; 55/466; 55/DIG. 30; 60/286; 60/303
[58] Field of Search ............ 60/275, 286, 303; 55/466, DIG. 30

[56] References Cited

U.S. PATENT DOCUMENTS

| | | | |
|---|---|---|---|
| 4,477,771 | 10/1984 | Nagy et al. | 324/58.5 |
| 4,934,141 | 6/1990 | Ollivon | 60/275 |
| 5,074,112 | 12/1991 | Walton | 60/275 |
| 5,087,272 | 2/1992 | Nixdorf | 60/275 |

FOREIGN PATENT DOCUMENTS

| | | | |
|---|---|---|---|
| 59-126022 | 7/1984 | Japan | 60/275 |
| 61-11416 | 1/1986 | Japan | 60/275 |

Primary Examiner—Douglas Hart
Attorney, Agent, or Firm—Panitch Schwarze Jacobs & Nadel

[57] ABSTRACT

An apparatus for regenerating a filter provided to scavenge particulate which is included in exhaust gas discharged from an internal combustion engine. The apparatus includes a heating room accommodating the filter, a heat-combusting device for heat-combusting the particulate scavenged by the filter, a microwave generating device for generating a microwave to be supplied to the heating room, a slit provided in a wall of the heating room, a microwave detecting device for detecting the energy level of the microwave coupled through the slit, and a control section for controlling the heat-combusting device.

11 Claims, 4 Drawing Sheets

FILTER REGENERATING APPARATUS FOR AN INTERNAL COMBUSTION ENGINE

BACKGROUND OF THE INVENTION

1. Field of the Invention

The present invention relates to a filter regenerating apparatus for an internal combustion engine, and in particular, for regenerating a filter provided to scavenge a particulate included in exhaust gas discharged from an internal combustion engine. More particularly, the present invention relates to a filter regenerating apparatus equipped with an improved detecting device for detecting an amount of the particulate scavenged by the filter utilizing an electric wave.

2. Description of the Prior Art

In the field of the global environmental conservation, how to deal with the global warming and how to reduce the amount of $CO_2$ in the atmosphere is a matter of the primary importance today. Moreover, how to reduce acid rain which is destroying forests is an equally critical subject.

Acid rain is a natural phenomenon caused by the air polluted by the chemicals such as sulfur oxide and nitrogen oxide. Recently, the controls over discharge of these polluting chemicals have been tightened worldwide both for fixed sources (handled by the cogeneration system) and mobile sources such as vehicles. Special attention has been paid to the exhaust gas from vehicles, which is subjected to density controls. Most notably, it is now being discussed whether to replace the present density controls with amount controls. In addition, the limits are also planned to be greatly lowered.

Among vehicles, the one using an internal combustion engine is the subject of some of the more stringent restrictions. More strict regulations are being considered for exhaust particulate as well as for nitrogen oxides. In the past, the polluting chemicals included in the exhaust gas have been reduced by an improved combustion method of, for example, delaying the fuel injection time. However, such a method is considered to be insufficient to achieve the goal of global environmental conservation.

Therefore, it is required today to attach an after treatment device for the exhaust gas. The after treatment device includes a filter for scavenging the particulate. However, if the particulate is scavenged to the full capacity of the filter, the filter soon becomes clogged. Accordingly, the scavenging capability of the filter is lowered and a smooth flow of the exhaust gas is prevented. As a result, the engine output is significantly reduced or stopped.

Under these circumstances, technological efforts to regenerate the filter have been made worldwide. However, none of these efforts have been put into practical use.

It is known that the particulate is combusted at a temperature of 600° C. or higher. As a medium for generating energy to heat the particulate to such a high temperature, a burner, an electric heater, a microwave and the like have been considered. Whichever the medium is used, an amount of the particulate scavenged by the filter must be detected in order to efficiently regenerate the filter.

A method for detecting the amount of the particulate using an electric wave is disclosed in U.S. Pat. No. 4,477,771. FIG. 6 in the present application shows an apparatus disclosed in the above patent. The apparatus includes an exhaust pipe 1 through which an exhaust gas discharged by the internal combustion engine is flowed, a heating room 2 provided in a portion of the exhaust pipe 1, a filter 3 accommodated in the heating room 2 so as to scavenge exhaust particulate, a microwave generating device 4 for generating a microwave to be supplied to the heating room 2, a microwave supplying antenna 5 for radiating the microwave generated by the microwave generating device 4 in the heating room 2, and a microwave detecting antenna 6 for detecting the energy level of the microwave returned from the heating room 2 through the filter 3. The amount of the particulate scavenged by the filter will be referred to herein simply as the "particulate amount".

In the above construction, as the particulate amount is increased, the effective dielectric factor is changed. Accordingly, a resonant condition of the microwave in the heating room 2 is changed. The change in the resonant condition is monitored based on a change in transmission characteristics of the microwave, and thus the particulate amount is detected.

Such a conventional apparatus still has drawbacks associated with detecting the particulate amount, and with the construction which prevent a highly precise detection of the particulate amount. The biggest problem is attributed to the characteristics of the particulate with respect to the microwave. The main component of the particulate is carbon. The aforementioned patent employs a principle utilizing only static characteristics of the filter. In other words, the particulate amount is detected simply based on a change of the dielectric factor of a space including the filter. As the particulate amount is increased, the effective dielectric factor of the above space is increased. The dielectric loss of the above space is also increased because the particulate absorbs the microwave. Accordingly, the microwave in the heating room 2 is concentrated in the above space. The change of the effective dielectric factor and the dielectric loss of the filter also increases the energy level of the microwave stored in the filter 3.

Since the filter 3 is interposed between the microwave supplying antenna 5 and the microwave detecting antenna 6, the level of a signal detected by the microwave detecting antenna 6 is changed in a complicated manner in accordance with the change of the microwave distribution and the energy level of the microwave stored in the filter 3. Due to the complicated change of the level of the signal, it is difficult to detect the particulate amount with sufficient precision to determine the appropriate timing to heat-combust the particulate for filter regeneration.

Another problem associated with the conventional apparatus is that the microwave detecting antenna 6 is disposed in the heating room 2. With such a construction, it is difficult to provide the microwave detecting antenna 6 and related peripheral devices with sufficient protection from the heat generated for combusting the particulate. Further, the particulate accumulates in the vicinity of the microwave detecting antenna 6, thereby preventing stable detecting precision. As a result, a highly reliable detecting antenna 6 cannot be realized.

SUMMARY OF THE INVENTION

An objective of the present invention is to provide a filter regenerating device for an internal combustion engine, which detects an amount of a particulate scavenged by a filter with high precision.

Another objective of the present invention is to provide a filter regenerating device for an internal combustion engine which includes a detecting device having reliable durability.

Still another object of the present invention is to provide a filter regenerating device for an internal combustion engine, in which a particulate scavenging capacity can be maintained at a high level for a long period of time.

The filter regenerating apparatus for an internal combustion engine of this invention, which overcomes the above-discussed and numerous other disadvantages and deficiencies of the prior art, includes a heating room provided in an exhaust pipe for discharging an exhaust gas from the internal combustion engine; a filter, accommodated in the heating room, for scavenging particulate included in the exhaust gas; a heat-combusting device for heat-combusting the particulate; a microwave generating device for generating a microwave to be supplied to the heating room; a particulate amount detecting device for detecting an increase of an amount of the particulate scavenged by the filter; and a control section for controlling the heat-combusting device based on a detection signal of the particulate amount detecting device. The particulate amount detecting device includes a microwave detecting device for detecting a change of an amount of a surface current generated on a wall of the heating room by the microwave.

Alternatively, the filter regenerating device for an internal combustion engine includes a heating room provided in an exhaust pipe for discharging an exhaust gas of the internal combustion engine; a filter, accommodated in the heating room, for scavenging particulate included in the exhaust gas; a microwave generating device for generating a microwave, which is supplied to the heating room and thus heats the particulate due to the dielectric loss of the particulate; an air supplying device for supplying air for promoting a combustion of the particulate; a particulate amount detecting device for detecting an amount of the particulate scavenged by the filter; and a control section for controlling the microwave generating device and the air supplying device based on a detection signal of the particulate amount detecting device. The particulate amount detecting device includes a microwave detecting device for detecting a change of an amount of a surface current generated on a wall of the heating room by the microwave.

In a preferred embodiment of the invention, the particulate amount detecting device includes a slit in the wall of the heating room and an antenna provided outside the heating room in the vicinity of the slit, and the antenna detects the change of the amount of the surface current based on a detected energy level of the microwave.

In a preferred embodiment of the invention, the microwave detecting device is equipped with a detecting circuit for converting the energy level of the microwave detected by the antenna into a DC voltage.

In a preferred embodiment of the invention, the wall of the heating room has the slit in an area opposed to the filter.

In a preferred embodiment of the invention, the microwave generated by the microwave generating device has a frequency in the ISM frequency band.

Alternatively, the filter regenerating device for an internal combustion engine includes a heating room provided in an exhaust pipe for discharging an exhaust gas of the internal combustion engine; a filter, accommodated in the heating room, for scavenging particulate included in the exhaust gas; a microwave generating device for generating a microwave, which is supplied to the heating room and thus heats the particulate due to the dielectric loss of the particulate; a particulate amount detecting device for detecting an amount of the particulate scavenged by the filter; and a control section for controlling the microwave generating device based on a detection signal of the particulate amount detecting device. The particulate amount detecting device includes a slit in the wall of the heating room and an antenna provided outside the heating room in the vicinity of the slit.

The filter regenerating apparatus having the above construction operates according to the following principles.

When the particulate amount is increased, the effective dielectric factor and the dielectric loss of the filter are increased. Therefore, a higher level of the microwave energy is stored in a space including the filter as compared to the space not including the filter.

The above change of the effective dielectric factor and the dielectric loss of the filter also varies the distribution of the microwave in the heating room.

A surface current is distributed on the wall of the heating room as a function of the microwave distribution. In the case when the wall has the slit for cutting off the surface current, an electromagnetic field is coupled outside the heating room through the slit. The energy level of the electromagnetic field coupled through the slit changes in accordance with a change of the microwave distribution in the heating room and the surface current distribution. The particulate amount is detected based on a degree of such change.

In the case when the microwave is used for heating the particulate and for detecting the particulate amount, the microwave supplying device is constructed so that a maximum level of microwave energy is provided to the heating room in a predetermined range of the particulate amount. Such a construction is realized by the use of the general load matching technology.

With the microwave supplying device constructed as is mentioned above, as the particulate amount is increased toward the predetermined amount, the energy level of the microwave supplied to the heating room from the microwave supplying device is increased. Such a microwave is used for detecting the particulate amount.

However, the energy level of the microwave in the space not including the filter is not increased in proportion to the energy level of the microwave supplied to the heating room since the energy of microwave is concentrated in the space including the filter as the effective dielectric factor and the dielectric loss increase.

In this case also, the energy level of the microwave is detected based on a degree of the change of the microwave distribution in the heating room and the surface current distribution. Since the particulate is selectively heated in accordance with the increase of the dielectric loss of the filter, it is desirable to execute the detection in a short period of time.

According to the above construction, a change of surface current distribution corresponding to the microwave distribution in the heating room and a change of the energy level of the electromagnetic field coupled through the slit are comprehensively detected. Moreover, owing to the slit made for detecting the change of the energy level of the electromagnetic field in a wider area, even a small change of the energy level of the electromagnetic field in the vicinity of the slit can be detected. These two facts remarkably enhance the detecting precision.

The detecting device is provided outside the heating room. Accordingly, the detecting device is protected from excessive heat, and as a result, durability of the apparatus is improved. Further, the accumulation of the particulate in the vicinity of the detecting device can be avoided to realize higher detection accuracy. The slit, which is provided on the wall supporting the filter, is segregated from the exhaust gas flow. Therefore, the exhaust gas is prevented from flowing out through the slit.

Since the particulate amount is detected based on the comprehensive information relating to the heating room, the heating room can be constructed in an optimum way in accordance with the filter structure regardless of the resonant condition of the microwave in the frequency band thereof.

BRIEF DESCRIPTION OF THE DRAWINGS

This invention may be better understood and its numerous objects and advantages will become apparent to those skilled in art by reference to the accompanying drawings as follows.

DETAILED DESCRIPTION OF THE PREFERRED EMBODIMENTS

The present invention will be described by way of illustrating embodiments with reference to the accompanying drawings.

Figure 1:
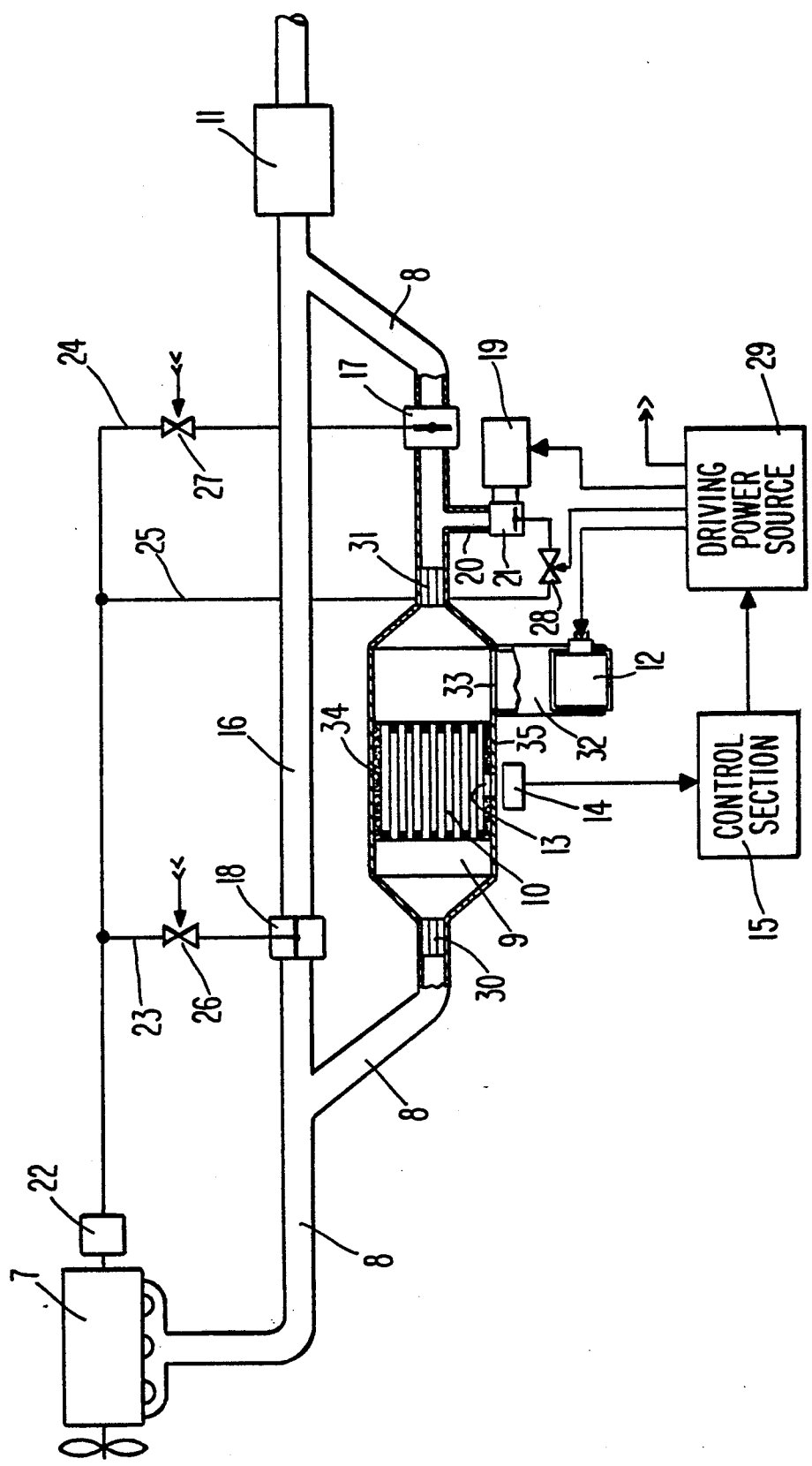
FIG. 1 is a schematic view of a filter regenerating apparatus for an internal combustion engine according to an example of the present invention.

FIG. 1 shows an exemplary example of a filter regenerating apparatus according to the present invention. In FIG. 1, the filter regenerating apparatus includes a heating room 9 disposed in a portion of an exhaust pipe 8, and a filter 10 which is accommodated in the heating room 9. An exhaust gas discharged from an internal combustion engine 7 flows through the exhaust pipe 8 and through the filter 10, and is discharged through a muffler 11. While the exhaust gas flows through the filter 10, the filter 10 scavenges the particulate included in the exhaust gas. A microwave for heating the particulate scavenged by the filter 10 is generated by a microwave generating device 12 and is fed to the heating room 9 by way of a feeding slit 33 located at a position downstream of the filter 10 relative to the flow of the exhaust gas. The microwave generating device 12 is controlled to feed the microwave in a predetermined time cycle (the time when the engine is not driven is excluded). A wall 35 of the heating room 9 has a slit 13 on an appropriate portion thereof, the wall 35 being opposed to an outer surface of the filter 10. The slit 13 is positioned to out off a surface current 36 (FIG. 2) flowing on the wall 35, the surface current 36 being derived in accordance with the distribution of the microwave formed in the heating room 9. Provided outside the heating room 9 and in the vicinity of the slit 13 is a microwave detecting device 14. The microwave detecting device 14 is used for detecting an energy level of the microwave which is coupled through the slit 13 and for providing a signal to a control section 15 representative of such energy level.

In accordance with an increase of the amount of the particulate scavenged by the filter 10, the effective dielectric factor and the dielectric loss of the filter 10 increase. Accordingly, the microwave energy becomes concentrated in a space including the filter 10, and the distribution of the microwave in the whole heating room 9 is changed.

During the above operation cycle of the microwave generating device 12, the microwave detecting device 14 detects the energy level of the microwave which is coupled through the slit 13.

The level of the signal obtained by the microwave detecting device 14 is periodically compared with a reference level stored in the control section 15. Each time the level of the signal reaches the reference level, the control section 15 controls the regeneration of the filter 10 using an air and gas passing system described as follows.

As is shown in FIG. 1, an exhaust pipe 16 having no filter is provided in parallel with the exhaust pipe 8 having the filter 10. The exhaust pipe 8 has a valve 17 downstream of the filter 10, and the exhaust pipe 16 has a valve 18. The valves 17 and 18 are provided for controllably passing or blocking the exhaust gas. An air supply device 19 includes a compressor or an air blower (not shown) and an air passing tube 20 are provided for sending air to the exhaust pipe 8 between the filter 10 and the valve 17. The air passing tube 20 has an air valve 21 for controllably passing or blocking the air. The valves 17, 18 and 21 are opened or closed by controlling a vacuum pump 22 in combination with cross valves 26, 27 and 28 provided in the middle of vacuum tubes 23, 24 and 25.

The air and gas passing system having the above construction is operated in the following way each time the level of the signal reaches the reference one. First, the valve 18 is opened and the valve 17 is closed, whereby the exhaust gas is flowed through the exhaust tube 16 and discharged to the outside air through the muffler 11. During this time, the air valve 21 is closed. Then, the microwave generating device 12 is driven by a driving power source 29 so that the microwave is supplied to the heating room 9. After a predetermined time, the air valve 21 is opened, and simultaneously the air supply device 19 is driven by the driving power source 29 so that air is sent to the exhaust pipe 8. After a predetermined time, the microwave generating device 12 is stopped, and after another predetermined time, the air supply device 19 is stopped and the air valve 21 is closed. Thereafter, the valve 17 is opened and the valve 18 is closed, thereby allowing the exhaust gas to pass through the filter 10. Thus, the particulate is again scavenged by the filter 10.

The heating room 9 is defined by microwave blocking devices 30 and 31 having a honeycomb shape or formed of a punched plate, for example. The microwave generated by the microwave generating device 12 is supplied to the heating room 9 through a microwave transmitting device 32 including a rectangular waveguide tube and a feeding slit 33 on the wall 35. The feeding slit 33 is covered with a plate (not shown) having a low dielectric loss. The filter 10 is supported by the walls of the heating room, with a heat insulating materials 34 being interposed between the filter 10 and each wall.

In this construction, when the microwave is supplied to the heating room 9, a particular microwave distribution corresponding to the particulate amount is generated in the heating room 9. As the particulate amount increases, the wavelength of the microwave in the filter 10 is compressed by the increased dielectric loss. As a result, the microwave distribution is changed, and a distribution of the surface current 36 on the wall 35 is changed accordingly.

As the particulate amount is increased, an increased energy level of the microwave is stored in the filter 10 acting as a dielectric material. Further, the microwave selectively provides an energy thereof to the particulate scavenged by the filter 10 due to the higher values of dielectric loss coefficient of the particulate. In the case that such an energy is high, the particulate can be heated to a specified temperature within a short period of time.

Due to the change of the dielectric factor and the dielectric loss, the distribution of the surface current 36 on the wall 35 is changed.

Figure 2:
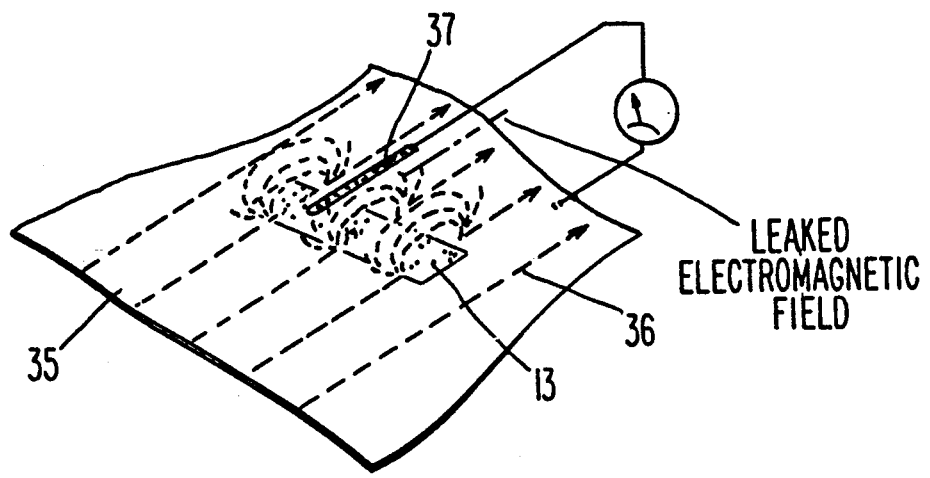
FIG. 2 is a view illustrating a principle of detecting a microwave in accordance with the present invention.

FIG. 2 illustrates the electromagnetic field characteristics in the vicinity of the slit 13 and also illustrates the principle of detecting the energy level of the microwave. As is mentioned above, the slit 13 cuts off the surface current 36 generated on the wall 35. Due to the characteristics of the surface current 36, an electromagnetic field is coupled or "leaked" outside the heating room 9 (upper side in FIG. 2) through the slit 13 having an appropriate size.

An antenna 37 constituting the microwave detecting device 14 is provided in such a position as to receive the electromagnetic field coupled through the slit 13. While a conventional linear receiving antenna inserted into a heating room only provides information on a local electromagnetic field, the antenna 37 provides information with respect to a wider area of the electromagnetic field. Therefore, the microwave characteristics of the whole heating room 9 can be detected with high precision by the antenna 37.

since the microwave detecting device 14 is provided outside of the heating room 9, the detecting device 14 has sufficient isolation from the heat, and an accumulation of the particulate in the vicinity of the detecting device 14 can be avoided.

Owing to the above principle of detecting the change of the surface current distribution on the wall 35 of the heating room 9 by the detecting device 14 disposed outside of the heating room 9, the heating room 9 can be constructed in an optimum way corresponding to the filter structure regardless of the resonant condition of the microwave in the frequency band thereof.

In the event that a microwave having a frequency in the ISM frequency band (allocated to industry, science and medicine; for example, 915 MHz, 2450 MHz and 5800 MHz) is used to heat the particulate, the particulate amount can be detected by an output of the same microwave.

Figure 3:
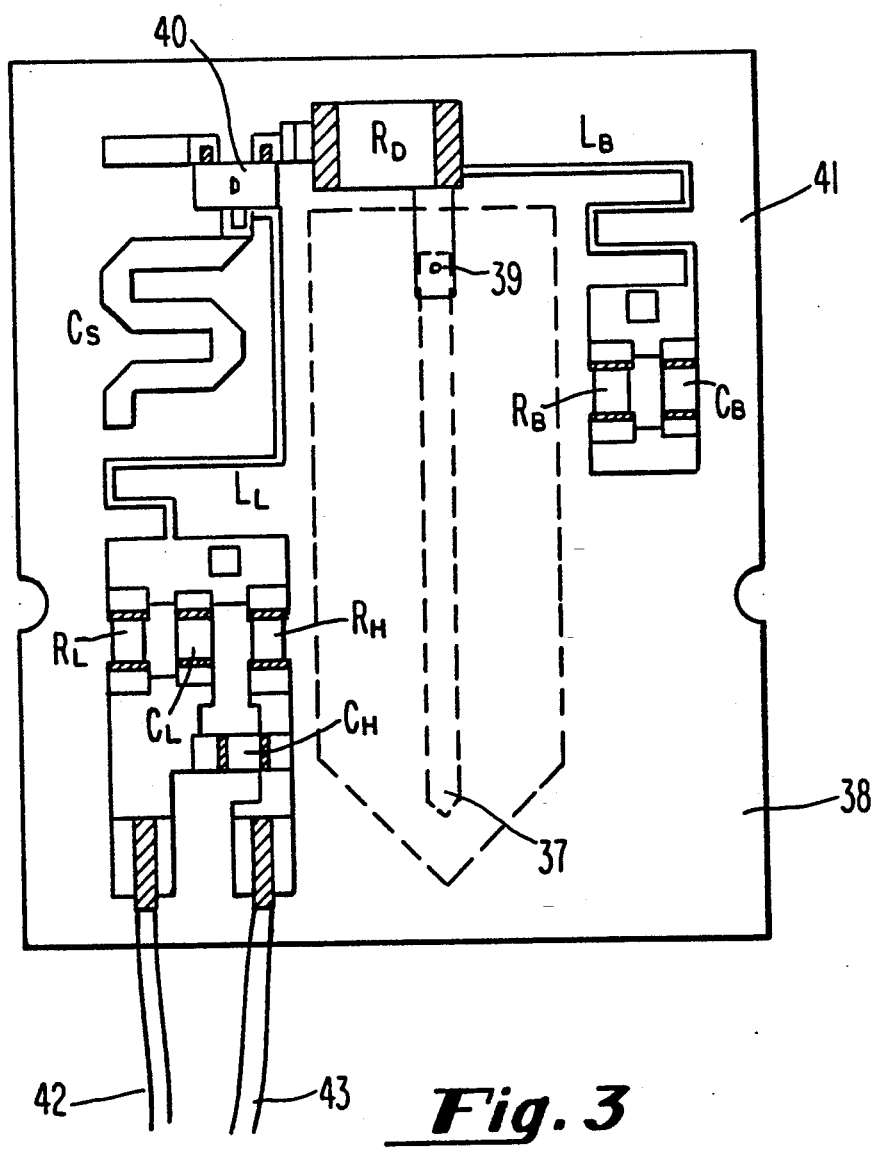
FIG. 3 is a schematic view of a detecting circuit in accordance with the present invention.

The energy level of the microwave detected by the antenna 37 is converted into a DC voltage by a detecting circuit 41 so as to be easily handled as a control signal. FIG. 3 shows an example of the detecting circuit 41 including a Schottky-barrier diode 40. The broken line indicates a circuit pattern on a rear surface of a printed circuit board 38. This pattern constitutes the antenna 37. The microwave energy received by the antenna 37 is introduced into the detecting circuit 41 through a throughhole 39, converted into a DC voltage by the detecting circuit 41, and is sent to the control section 15 through leads 42 and 43.

Figure 4:
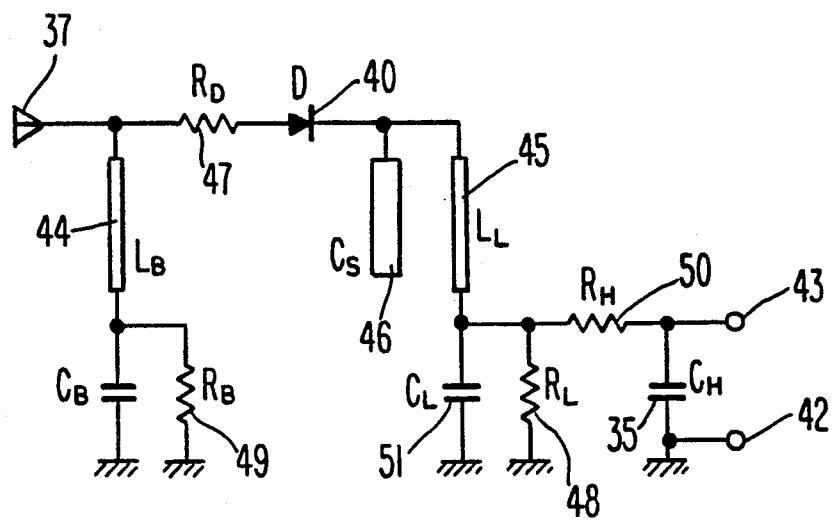
FIG. 4 is an equivalent circuit diagram of the detecting circuit shown in FIG. 3 in accordance with the present invention.
Figure 6:
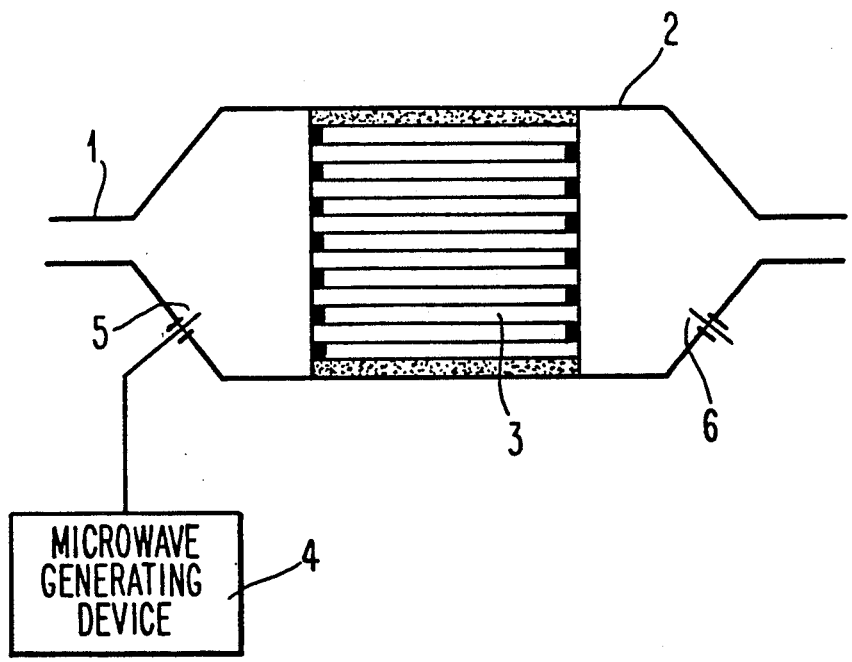
FIG. 6 is a view illustrating a construction a conventional filter regenerating apparatus for an internal combustion engine.

The operation of the detecting circuit 41 will be described with reference to FIG. 4. The detecting circuit 41 is designed so that microstrips $L_B$ 44 and $L_L$ 45 have an infinite impedance and that a microstrip $C_S$ 46 has an impedance of 0 in the center frequency of the microwave sent from the antenna 37.

Owing to such a characteristic of the microstrip $C_S$ 46, the microwave received by the antenna 37 is grounded through a resistance $R_D$ 47 and the Schottky-barrier diode 40. At this point, the forward current (flowing to the right in FIG. 4) rectified by the Schottky-barrier diode 40 is provided to a load resistance $R_L$ 48 as a direct current. The same current flows to a resistance $R_B$ 49 to form a closed loop of the direct current. A half-wave rectified waveform of the current flowed to the load resistance $R_L$ 48 is smoothed by a resistance $R_H$ 50 and a capacitor $C_L$ 51, and the above current is output through the leads 42 and 43.

The overall operation of the filter regenerating apparatus having the above construction will now be described.

When the microwave is supplied to the heating room 9 accommodating the filter 10, the particulate scavenged by the filter 10 starts to be heated. At this point, since almost no air or no exhaust gas is allowed to pass through the filter 10, the particulate scattered in the whole filter 10 is effectively heated by the microwave without being cooled by an active air flow in the filter 10, thereby obtaining a temperature of a range in which the particulate can be combusted (hereinafter, referred to as "a temperature of the combustion range").

After a predetermined period of time, the air for promoting the combustion of the particulate is supplied to the heating room 9 from the air supply device 19. The above predetermined period of time is selected based on the energy level of the microwave supplied to the heating room 9, the predetermined area for scavenging the particulate, and the like.

The amount of the air supplied to the filter 10 can be controlled. For example, the initial amount of the air is controlled to be appropriate to promote the combustion of the particulate but restrict the area in which combustion occurs (hereinafter, referred to as the "combustion area") from spreading in the air flow direction.

It is possible that such a control undesirably prevents the temperature from rising in an area of the filter 10 where the particulate is not yet heated to a temperature of the combustion range. On the other hand, such a control has an effect of avoiding a temperature decline in the area, by supplying the air in an extremely low amount.

In the event that the particulate is heated to a temperature of the combustion range, the air promotes the combustion. Accordingly, the heat generated by the combustion is added to the heat generated by the microwave, and the combined heat is transmitted in the filter 10, thereby enlarging the combustion area.

Thereafter, the amount of the air is increased, thereby moving the combustion area in a longitudinal direction of the filter 10 (in the flowing direction of the exhaust gas). This movement continues for a predetermined period of time until the filter 10 is regenerated.

While the amount of the air is increased, the supply of the microwave can be stopped after an appropriate period of time. The time to stop the supply is controlled by a predetermined time or based on the signal obtained by the microwave detecting device 14. Then, after an appropriate time, the supply of the air is stopped. Although the supply of the microwave may be stopped simultaneously with, or earlier than, the stop of the supply of the air, the regeneration of the filter 10 is usually completed by keeping the supply of the air for a predetermined period of time after the supply of the microwave is stopped.

The predetermined time may be determined by the use of a device for detecting a degree of the regeneration, for example, the temperature of an exhaust heat obtained by the combustion.

When the filter 10 regeneration is completed by the above operation, the exhaust gas is allowed to flow to the filter 10 after an appropriate period of time.

According to the above control, the supply of the microwave as the heating medium is controlled by accurately detecting that the particulate amount has reached a predetermined level. Therefore, a reliable filter regeneration performance is realized.

The detection of the particulate amount is conducted in a predetermined cycle. It is desirable to shorten the interval in accordance with the increase of the particulate amount in order to realize a more reliable filter regeneration.

The filter regenerating apparatus according to this example detects the particulate amount by the use of the microwave, which is also used as the medium for heating the particulate. However, the heating medium is not limited to the microwave.

The slit 13 may be disposed on a wall of the heating room 9 through which the exhaust gas flows out.

The microwave generating device 12 may be disposed in the heating room 9 so as to be opposed to the microwave detecting device 14 with the filter 10 therebetween.

Figure 5:
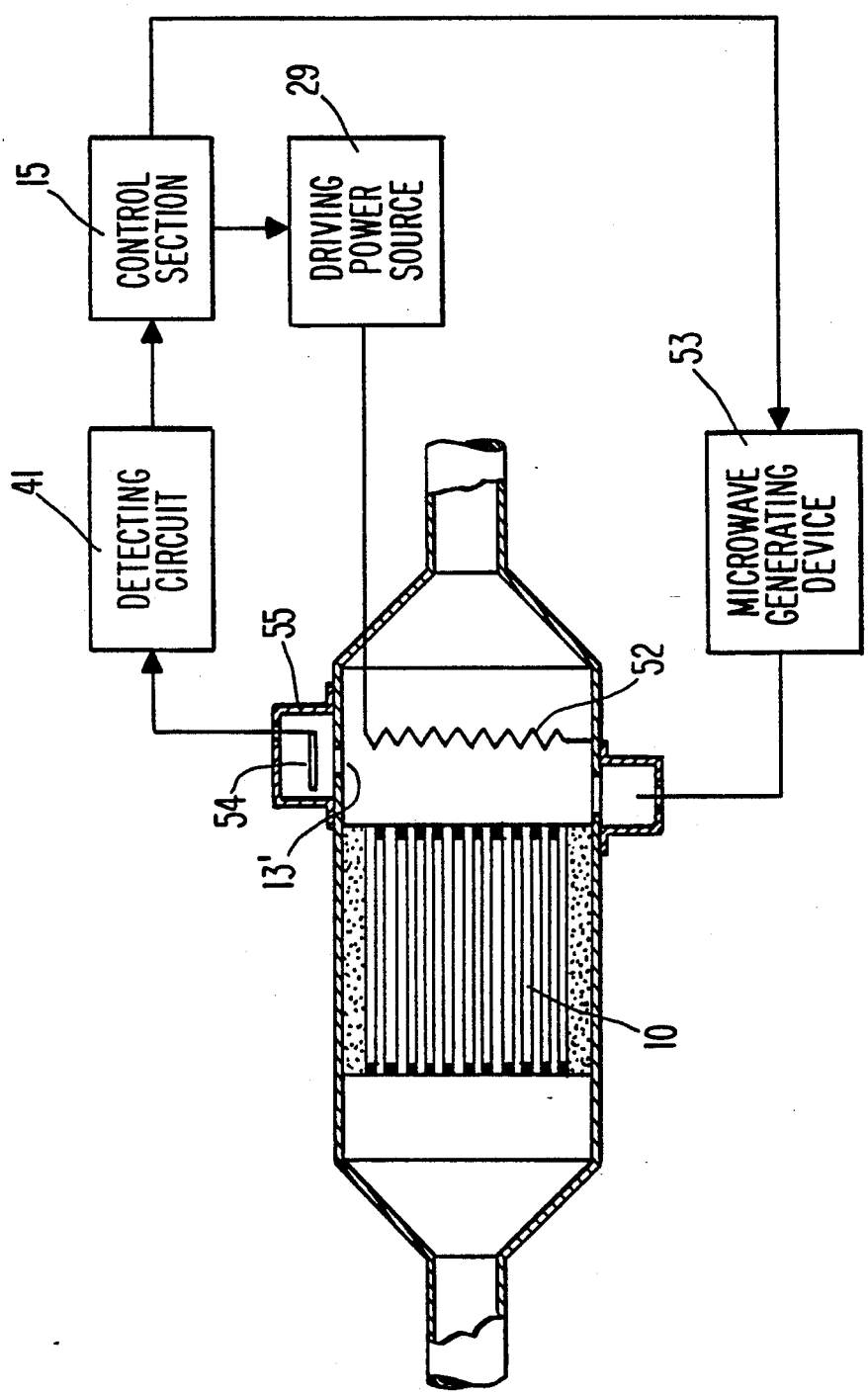
FIG. 5 is a schematic view of a filter regenerating apparatus for an internal combustion engine according to another example of the present invention.

FIG. 5 shows an essential section of another example of this invention, in which an electric heater 52 is used as the heating medium. The apparatus comprises the electric heater 52, a microwave generating device 53 for generating a microwave only to detect the particulate amount according to the method described above, and a slit 13' made on a wall of the heating room 9 through which the exhaust gas flows out. An antenna 54 (equivalent to the antenna 37 in the previous example) for detecting the energy level of the microwave is covered with a box 55 for the purpose of preventing the exhaust gas from flowing out. In this construction, the particulate amount is detected with high precision as in the previous example.

The microwave can be used to heat the particulate in the construction of this example.

The filter regenerating apparatus according to the present invention has the following effects:

(1) The effective dielectric factor and the dielectric loss of the filter are changed in accordance with an increase of the amount of the particulate scavenged by the filter. Accordingly, the change of the microwave characteristics in the whole heating room is detected based on a change of the energy level of the microwave coupled through the slit on the wall of the heating room. As a result, the amount of the particulate scavenged by the filter can be detected with high precision.

(2) Since the energy level of the microwave coupled through the slit having an appropriate size is detected, the detecting precision can be enhanced compared with the construction using an antenna which is contained or protrudes into the heating room.

(3) Since the detecting device is provided outside the heating room, the detecting device has sufficient protection from excessive heat and can be located with a higher degree of freedom.

(4) Since the detecting device can be located in the vicinity of the wall of the heating room containing the filter, a special device for handling the exhaust gas leak can be eliminated.

(5) Since the amount of the particulate is detected based on the comprehensive information on the microwave in the heating room, the heating room can be constructed in an optimum way corresponding to the filter structure regardless of the resonant condition of the heating room.

(6) In the case when the particulate is heated by the microwave, the signal of the same microwave can be used to detect the amount of the particulate scavenged by the filter. Therefore, the detecting precision is enhanced.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. A filter regenerating device for an internal combustion engine, the filter regenerating device comprising:
    a heating room provided in an exhaust pipe for discharging an exhaust gas from the internal combustion engine;
    a filter, accommodated in the heating room, for scavenging particulate included in the exhaust gas;
    heat-combusting means for heat-combusting the particulate;
    microwave generating means for generating a microwave to be supplied to the heating room;
    particulate amount detecting means for detecting an increase of an amount of the particulate scavenged by the filter, the particulate amount detecting means comprising microwave detecting means for detecting a change of an amount of the surface current generated on a wall of the heating room in accordance with the microwave; and
    a control section for controlling the heat-combusting means based on a detection signal of the particulate amount detecting means.

2. A filter regenerating device for an internal combustion engine, the filter regenerating device comprising:

a heating room provided in an exhaust pipe for discharging an exhaust gas of the internal combustion engine;

a filter, accommodated in the heating room, for scavenging particulate included in the exhaust gas;

microwave generating means for generating a microwave, which is supplied to the heating room and thus heats the particulate due to the dielectric loss of the particulate;

air supplying means for supplying an air, for promoting a combustion of the particulate;

particulate amount detecting means for detecting an amount of the particulate scavenged by the filter, the particulate amount detecting means comprising microwave detecting means for detecting a change of an amount of a surface current generated on a wall of the heating room in accordance with the microwave; and a control section for controlling the microwave generating means and the air supplying means based on a detection signal of the particulate amount detecting means.

3. A filter regenerating device for an internal combustion engine according to claim 1, wherein the particulate amount detecting means comprises a slit in the wall of the heating room and an antenna provided outside the heating room in the vicinity of the slit, and the antenna detects the change of the amount of the surface current based on a detected energy level of the microwave.

4. A filter regenerating device for an internal combustion engine according to claim 3, wherein the microwave detecting means is equipped with a detecting circuit for converting the energy level of the microwave detected by the antenna into a DC voltage.

5. A filter regenerating apparatus according to claim 3, wherein the wall of the heating room has the slit in an area opposed to the filter.

6. A filter regenerating device for an internal combustion engine according to claim 1, wherein the microwave generated by the microwave generating means has a frequency in the ISM frequency band.

7. A filter regenerating device for an internal combustion engine, the filter regenerating device comprising:

a heating room provided in an exhaust pipe for discharging an exhaust gas of the internal combustion engine;

a filter, accommodated in the heating room, for scavenging particulate included in the exhaust gas;

microwave generating means for generating a microwave, which is supplied to the heating room and thus heats the particulate due to the dielectric loss of the particulate;

particulate amount detecting means for detecting an amount of the particulate scavenged by the filter, the particulate amount detecting means comprising a slit in the wall of the heating room and an antenna provided outside the heating room in the vicinity of the slit; and a control section for controlling the microwave generating means based on a detection signal of the particulate amount detecting means.

8. A filter regenerating device for an internal combustion engine according to claim 2, wherein the particulate amount detecting means comprises a slit in the wall of the heating room and an antenna provided outside the heating room in the vicinity of the slit, and the antenna detects the change of the amount of the surface current based on a detected energy level of the microwave.

9. A filter regenerating device for an internal combustion engine according to claim 8, wherein the microwave detecting means is equipped with a detecting circuit for converting the energy level of the microwave detected by the antenna into a DC voltage.

10. A filter regenerating apparatus according to claim 8, wherein the wall of the heating room has the slit in an area opposed to the filter.

11. A filter regenerating device for an internal combustion engine according to claim 2, wherein the microwave generated by the microwave generating means has a frequency in the ISM frequency band.

* * * * *